(12) United States Patent
Zahn et al.

(10) Patent No.: US 8,945,393 B2
(45) Date of Patent: Feb. 3, 2015

(54) MAGNETIC COLLOID PETROLEUM OIL SPILL CLEAN-UP OF OCEAN SURFACE, DEPTH, AND SHORE REGIONS

(75) Inventors: Markus Zahn, Cambridge, MA (US); T. Alan Hatton, Sudbury, MA (US); Shahriar Rohinton Khushrushahi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 436 days.

(21) Appl. No.: 13/369,338

(22) Filed: Feb. 9, 2012

(65) Prior Publication Data
US 2012/0211428 A1  Aug. 23, 2012

Related U.S. Application Data

(60) Provisional application No. 61/445,590, filed on Feb. 23, 2011.

(51) Int. Cl.
*B03C 1/01* (2006.01)
*B03C 1/02* (2006.01)
(Continued)

(52) U.S. Cl.
CPC . *C02F 1/488* (2013.01); *B03C 1/02* (2013.01); *B01D 17/047* (2013.01); *B01D 17/06* (2013.01); *B03C 1/01* (2013.01); *B03C 11/00* (2013.01);
(Continued)

(58) Field of Classification Search
USPC .......................... 210/644, 671, 695, 925, 634; 252/62.51 R, 62.55, 62.56
See application file for complete search history.

(56) References Cited

U.S. PATENT DOCUMENTS

| 3,635,819 A | 1/1972 | Kaiser |
| 3,700,595 A | 10/1972 | Kaiser |

(Continued)

FOREIGN PATENT DOCUMENTS

| AU | 6801174 | 10/1975 |
| BE | 1009136 | 12/1996 |

(Continued)

OTHER PUBLICATIONS

The International Search Report and Written Opinion issued in connection with International Patent Application No. PCT/US2012/024958 mailed on Feb. 14, 2012.

*Primary Examiner* — David A Reifsnyder
(74) *Attorney, Agent, or Firm* — Sam Pasternack; MIT Technology Licensing Office

(57) ABSTRACT

Method for oil removal. The method includes adding a magnetizable material, with or without appropriately selected surfactants, of order micron (having no net magnetization) or nanometer size to magnetize the oil or water phase by either making a ferrofluid, magnetorheological fluid, a magnetic Pickering emulsion (oil in water or water in oil emulsion), or any other process to magnetize either oil or water phases. The magnetized fluid is separated from the non-magnetic phase using novel or existing magnetic separation techniques or by permanent magnets or electromagnets thereby separating oil and water phases. The magnetized particles are separated from the magnetized phase using novel or existing magnetic separation techniques to recover and reuse the particles. The two magnetic separation steps can be repeated to further increase recovery efficiency of the liquid phases and the magnetizable particles reused in this continuous process.

11 Claims, 5 Drawing Sheets

(51) Int. Cl.

| | |
|---|---|
| *C02F 1/38* | (2006.01) |
| *C02F 1/66* | (2006.01) |
| *C02F 1/68* | (2006.01) |
| *B01D 17/04* | (2006.01) |
| *B01D 17/06* | (2006.01) |
| *C02F 1/48* | (2006.01) |
| *B03C 11/00* | (2006.01) |
| *C02F 1/28* | (2006.01) |

(52) U.S. Cl.
CPC .............. *C02F 1/681* (2013.01); *B03C 2201/18* (2013.01); *C02F 1/281* (2013.01); *Y10S 210/925* (2013.01)
USPC ........... 210/695; 210/634; 210/671; 210/925; 252/62.51 R; 252/62.55; 252/62.56

(56) References Cited

U.S. PATENT DOCUMENTS

| | | | |
|---|---|---|---|
| 3,767,571 | A | 10/1973 | Lorenc et al. |
| 3,796,660 | A | 3/1974 | Kaiser |
| 7,303,679 | B2 * | 12/2007 | Ulicny et al. ................. 210/634 |
| 2005/0139550 | A1 | 6/2005 | Ulicny et al. |

FOREIGN PATENT DOCUMENTS

| | | |
|---|---|---|
| EP | 0125474 A1 | 11/1964 |
| FR | 2097879 | 3/1972 |
| FR | 2260536 A1 | 9/1975 |
| GB | 2319023 | 5/1998 |
| WO | 81/00122 A1 | 1/1981 |
| WO | 2011/008315 | 1/2011 |

* cited by examiner

MAGNETIC COLLOID PETROLEUM OIL SPILL CLEAN-UP OF OCEAN SURFACE, DEPTH, AND SHORE REGIONS

This application claims priority to U.S. provisional application No. 61/445,590 filed on Feb. 23, 2011, the contents of which are incorporated herein by reference.

BACKGROUND OF THE INVENTION

This invention relates to oil removal and more particularly to oil spill clean-up using magnetizable particles.

Oil spills can have devastating environmental consequences and many technologies exist to mitigate the effects. Rapid and innovative approaches are still needed, however, for successful remediation of major oil spills such as from the Macondo well in the Gulf of Mexico in 2010. Kaiser, in U.S. Pat. No. 3,635,819, has proposed mixing a colloidally stabilized magnetic fluid with spilled oil to form a stable suspension. The oil is then collected by application of a magnetic field to the oil/magnetic fluid combination. The practice of Kaiser's approach requires the use of ferrofluids containing single magnetic domain nanometer-sized particles with a stabilizing surfactant or surface coating to prevent magnetic particle agglomeration. The '819 patent limits the particles to a size less than 300 Å which is 30 nm. Such small particles are necessary for long-lived ferrofluids. These particles have a single magnetic domain and a net magnetic moment. These nanometer-sized particles necessarily have small surface areas which limit their ability to collect oil on their surfaces. Kaiser in claims 4 and 5 requires that the ferrofluid is sprayed over the surface of the oil spill and the ferrofluid should have a density less than the sea water on which it floats. This patent allows for the containment of the spilled oil, removing the density limitation when using a ferrofluid, and by magnetizing either the oil or water using alternate methods.

SUMMARY OF THE INVENTION

The method according to the invention for oil removal includes adding a magnetizable material, in a contained environment, of order nano, micron, or larger size to either the oil or water phase to form a ferrofluid, magnetorheological fluid, magnetic Pickering emulsion, or other type of magnetic fluid. The magnetizable material can be made with or without appropriately selected surfactants to be either hydrophilic (water loving) or oleophilic (oil loving). The magnetizable material is stirred into the oil/water mixture using a mechanical or inline mixer or using magnetic forces to form a substantially uniform distribution of the magnetizable material in the mixture. The magnetic fields to effect stirring may be alternating or rotating. These fields may be generated from single or multiphase currents in coils, magnet arrays that can be turned on and off, mechanically rotating permanent magnets, or from combinations of these magnetic field sources. Thereafter, the ferrofluid, magnetorheological fluid, or magnetic Pickering emulsion, is separated from the non-magnetic liquid phase using magnetic separation systems to separate oil and water phases. Those of ordinary skill in the art will recognize that a possible magnetic separator includes metal filtering meshes with pore size less than the magnetic particle size, magnetic filters, pumps with internal magnets with knife edges or any combination of these, in order to separate magnetic particles from the continuous phase. The choice of existing magnetic separation techniques, determined from the flowchart in FIG. 1, include low intensity magnetic separators (LIMS), rare earth drum separators (REDS), rare earth roll separators, wet high intensity magnetic separators (WHIMS) and high gradient magnetic separators (HGMS) systems. Those of skill in the art will recognize that a Halbach magnetic separator can be used. A Halbach array is an arrangement of permanent magnets that result in a one-sided magnetic flux. The system can be repeated with one or more magnetic separation systems to increase the recovery of the separated liquid phases. The magnetized liquid phase is then passed through another magnetic separation process (determined from the flowchart in FIG. 1) to separate out the magnetizable particles (for reuse) from the continuous phase. The continuous phase is collected and stored (typically in the case of oil) or disposed of or returned to the ocean (typically in the case of water). The process can be repeated to increase further recovery of magnetic particles from the continuous phase. The magnetizable particles are then reused in the mixing stage making the whole separation process continuous.

DESCRIPTION OF THE PREFERRED EMBODIMENT

Using existing oil spill cleanup technology such as a belt or suction skimmers and boom systems, an oil and water mixture is collected and transferred to a treatment apparatus either on board a ship or on land or other location. The treatment apparatus magnetizes either the oil or water phase in a contained environment in order to separate the two phases using appropriately selected magnetic separation techniques. This process can be continually repeated until the magnetic phase is sufficiently separated from the non-magnetic phase. The magnetic material is then removed from the magnetic phase using another appropriately selected magnetic separation process that is also continually repeated to ensure sufficient separation. The oil is transferred to a storage facility either on a ship or on land while the water is disposed of or released back into the ocean.

Figure 2A:
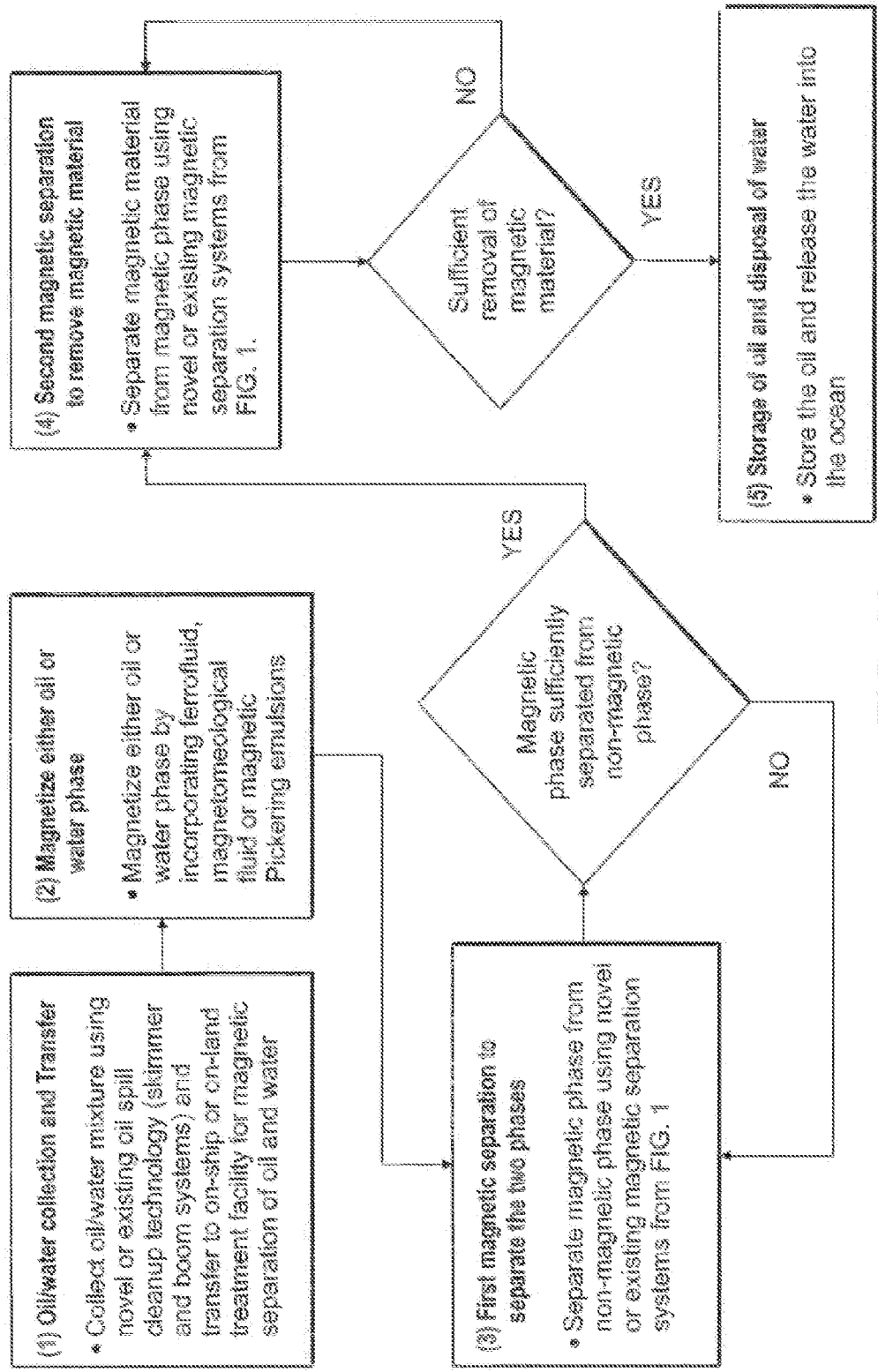
FIG. 2a is a flow chart illustrating an embodiment of the invention disclosed herein.
Figure 2B:
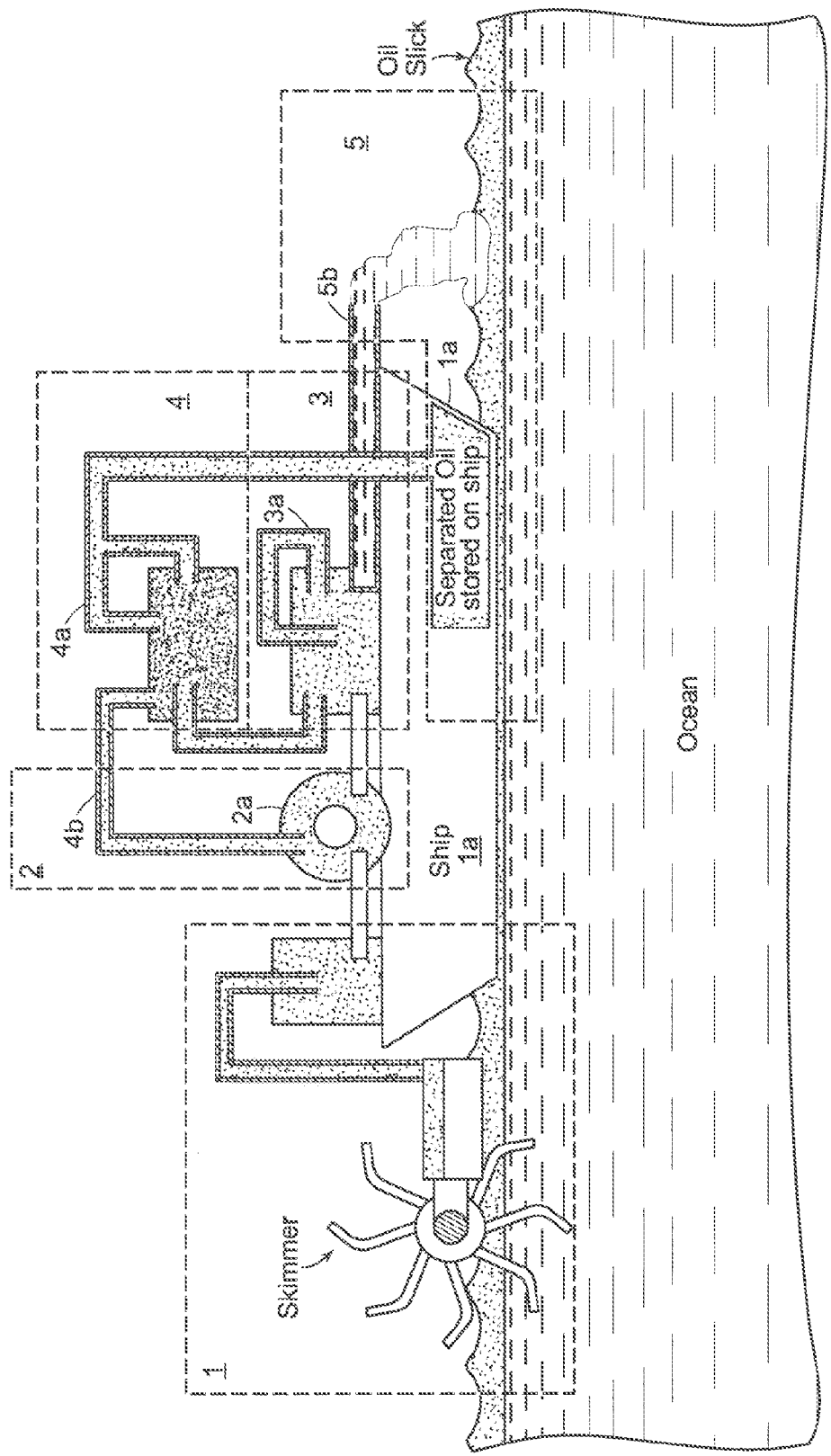
FIG. 2b is a schematic illustration of an embodiment of the invention.

With reference to FIG. 2b, an example of this embodiment is a belt skimmer 1 collecting oil and water that is pumped on board a ship 1a with a suitable treatment facility. The magnetized phase is separated from the non-magnetic phase before removing the magnetic material from the magnetic phase. The oil (with no magnetic material and no water) is stored on board the ship or transported onto land or other location, the clean water is released back into the ocean and the removed magnetic material is reused to separate further collected oil and water. In particular, and still referring to FIG. 2b, magnetic material is added to the oil/water to magnetize either the oil or water phases in element 2a and then the magnetic phase is separated from the non-magnetic phase in the first separation unit 3. This magnetic separation process is continually repeated until the magnetic phase is sufficiently separated from the non-magnetic phase at 3a. Clean water 5b is disposed of into the ocean if it is the non-magnetic phase.

The magnetic phase is pumped into a second magnetic separation system 4 to separate the magnetic material from the magnetic phase. The separation process is repeated continually until sufficient magnetic material is removed, 4a, and if the magnetic phase is water, the magnetic-free water is disposed of into the ocean. The magnetic material is reused to process more collected oil and water, 4b, while the oil is stored on board the ship 1a to be transported ultimately to a refinery.

Figure 1:
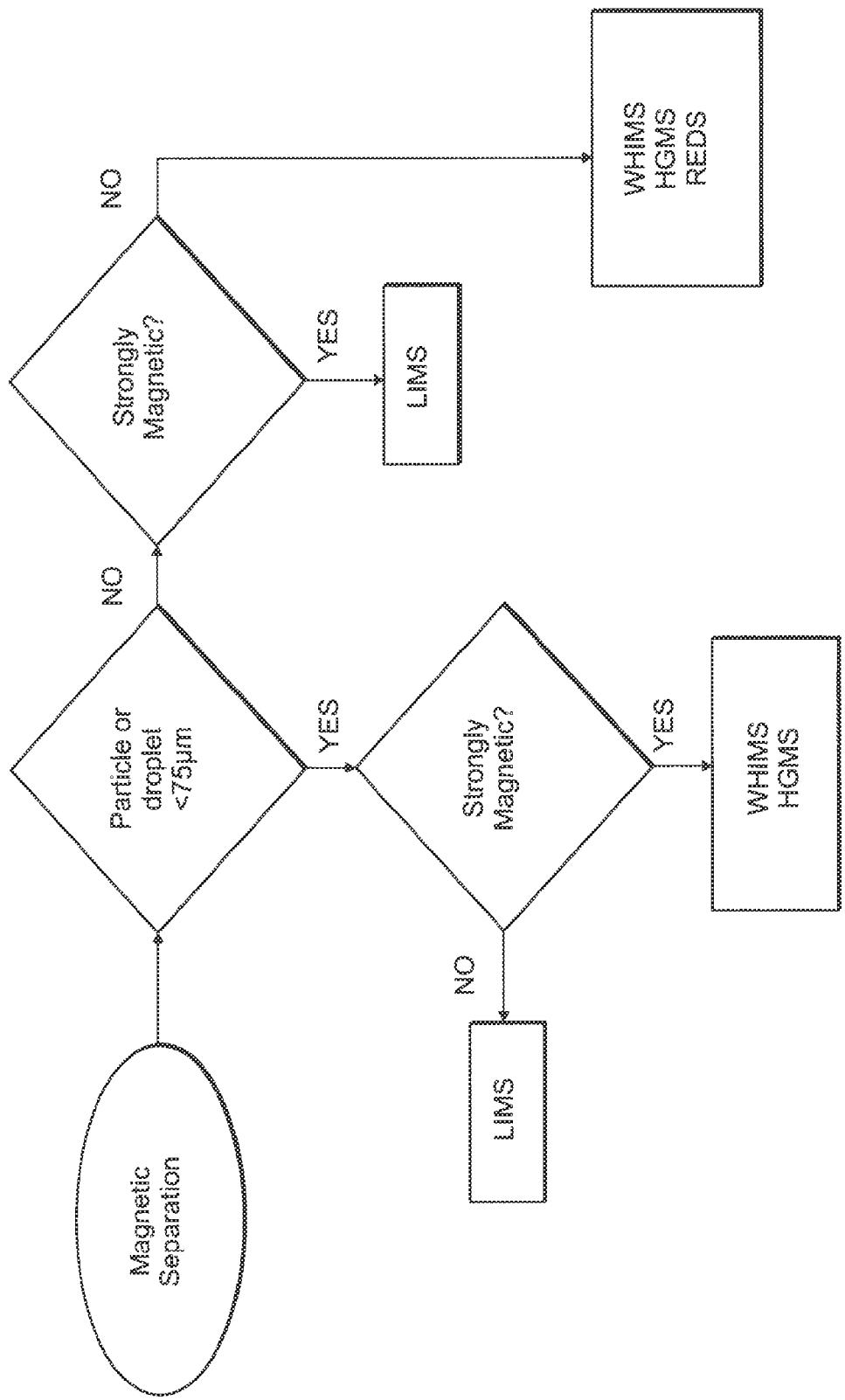
FIG. 1 is a flow chart outlining the selection of existing magnetic separation techniques.

In a preferred embodiment, the oil/water mixture is collected in a contained environment (on ship or on land) using novel or existing oil spill cleanup technologies (such as skimmer and boom systems) before the addition of magnetizable particles. The magnetizable particles are preferably solid materials with relative magnetic permeability much greater than unity with no net magnetization (if micron sized) until a magnetic field is applied. Possible materials include iron, cobalt, chromium, manganese or alkaline rare earth materials such as gadolinium, holmium, dysprosium, erbium, and terbium. The magnetic particles can be mixed using mechanical or inline mixers or local alternating and/or rotating magnetic fields used to stir the magnetizable particles into the oil or water phase to create a substantially uniform distribution of the magnetizable particles within either, but not both, liquid phases. Magnetic fields generated either from multiphase currents in coils or from mechanically rotating permanent magnets may be provided to facilitate the stirring. There are three typical ways to magnetize the oil using magnetizable particles:

1) Using nanometer sized particles with appropriate oil or water loving surfactants or surface coatings, the particles will be colloidally stable in the oil or water phase but not both. The particles can be added to the oil/water mixture in a contained environment in order to maximally magnetize the oil or water without any significant density or colloidal stability constraints. The magnetized liquid phase can be removed from the non-magnetic phase using novel or existing magnetic separation techniques (choice can be determined from flow chart in FIG. 1). Depending on the size and magnetic strength of the magnetic material using either a low intensity magnetic separator (LIMS), rare earth drum separator (REDS), rare earth roll separator, plate, wet roll, chute, wet high intensity magnetic separators (WHIMS) or high gradient magnetic separators (HGMS) can be selected. A Halbach array can also be used.

The magnetic particles can then be separated from the magnetized liquid using novel or existing magnetic separation systems and the particles recycled (FIG. 2). The process of separating the magnetic liquid phase from the non-magnetic phase can be repeated to increase recovery efficiency and the same can be done for separating the magnetizable particles from the separated magnetic liquid phase.

2) The particles are of micron size scale so that each particle has a relatively large surface area for contact with the liquid phase that is to be removed. The combination of the liquid phase and the magnetizable particles foams a magnetorheological fluid. The magnetizable material will not be colloidally stable in water or oil for a very long time but just long enough due to liquid viscosity to be applied to the collected oil from the ocean. In a preferred embodiment, the micron sized particles could also be added to one phase (water or oil) in the collected oil/water mixture, after it is removed from the ocean onto a boat or land location, and then separated using existing or novel magnetic separation systems (FIG. 2). The magnetizable particles could have surfactants that make them either oil or water loving.

Figure 3A:
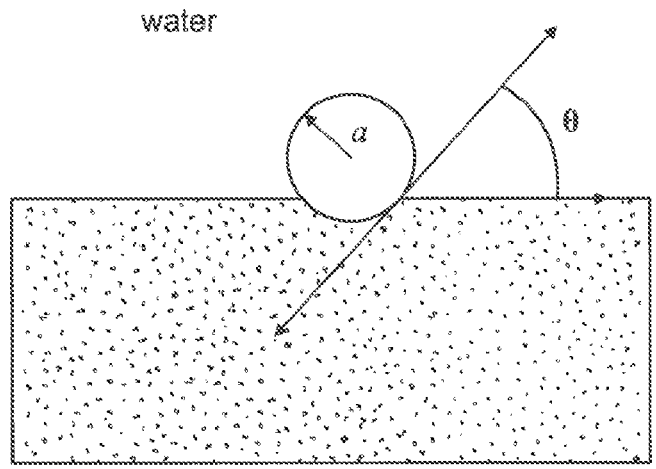
FIGS. 3a and b are schematic illustrations of a magnetic Pickering emulsion with hydrophilic particles for separating oil and water.
Figure 3B:
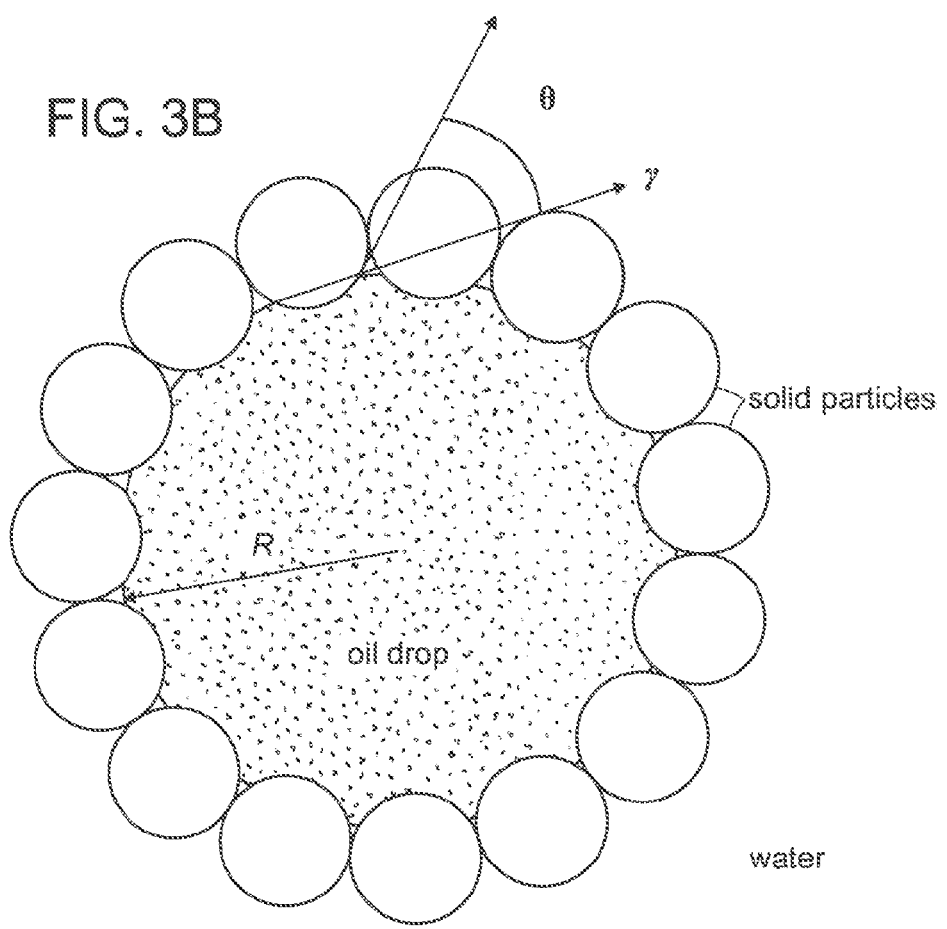

3) A preferred embodiment is to add magnetizable material to the collected oil/water mixture (nano or micron sized) to form a magnetic Pickering emulsion in a process chamber (2a in FIG. 2b). A Pickering emulsion (FIG. 3a, b) is an emulsion stabilized by a third phase—solid particles which adsorb onto the interphase between the two liquid phases. An important parameter for the design of a Pickering emulsion is the particles' "wettability" which is related to the three phase contact angle that determines the position of the particle relative to the water-oil interface. If the particles used are hydrophilic as shown in FIG. 3a, a larger fraction of the particle surface is in the water phase than the oil phase with a contact angle less than 90°. Mixing of these particles in oil and water, will arrange themselves in droplets such that the maximum surface area of the solid particles is in the water phase—stabilizing oil in water emulsions as shown in FIG. 3b. Likewise a hydrophobic particle forms a contact angle greater than 90° stabilizing water in oil emulsions. The size of the droplets formed depends on the concentration of the solid particles and the relative concentration of the oil and water phases. It is difficult to determine the relative concentration of the oil and water phases and as a result, droplets could form that are small and dense enough to sink in the continuous phase whereas other droplets could float. In either case, the magnetic droplets under the application of an external applied magnetic field can be transported and physically manipulated. In the case for droplets that float to be transported into the continuous phase, a critical magnetic field strength is the magnitude of the magnetic force, $F_{mag}=|\mu_0 n V_p (M \cdot \nabla) H|$, where n is the number of solid particles per unit volume; $V_p$ is the volume of the solid particle; $\mu_0 = 4\pi \times 10^{-7}$ H/m is the magnetic permeability of the oil or water which is equal to that of vacuum; M—the magnetization vector of the solid particle; H—the magnetic field vector, acting on the particles adsorbed on the drop surface that is greater than the drop's buoyancy force magnitude $(F_B = 4/3 \pi R^3 (\rho_{continuous} - \rho_{dispersed}) g)$. At high magnetic field strengths, the particles stabilizing the drops are stripped from the dispersed droplets and the emulsion destabilizes releasing the dispersed phase. Magnetic Pickering emulsions with this explained behavior could also be made using magnetic particles (nano or micron sized) with appropriately selected amphiphillic compounds/surfactants (Janus particles) adsorbed on the surface to control the type of emulsion formed (oil in water or water in oil). The particles used are not limited to being spherical in shape.

The magnetized liquid phase and the non-magnetic liquid phase are separated using existing magnetic separation techniques (choice of system determined from flow chart in FIG. 1) or a novel system, or using a Halbach array. This step can be repeated to increase the recovery of the separated magnetic phase. Using another magnetic separation step the magnetized particles are removed from the magnetized liquid phase and this process can be repeated to increase recovery efficiency of the particles. If the magnetized liquid phase was oil then the oil can be stored and the non-magnetic water phase can be returned to the ocean or disposed of. If the magnetized liquid phase was water, the water and oil are separated; the water-free oil is stored; the magnetic material in the water removed and the cleaned water returned to the ocean or disposed off (see FIG. 2b).

In all three methods of magnetizing the oil water mixture, the magnetic material used is reused for additional oil collection limiting the total amount of magnetic particles used for an entire cleanup. The substantially magnetic particle-free oil stream may be directed toward a pipeline that takes the oil to suitable tanks or reservoirs for storage. If desired, additional land-based holding tanks before entry to a storage facility can be used to allow further gravitational separation of oil from water in which the lower density oil will float on the water so that the higher density water can pass through a drain in the holding tank leaving only substantially pure oil in the holding tank with little or no water or magnetic particles. Centrifuges may be used to prevent emulsification. The cleansed oil can then be taken by pipeline or in barrels to an oil refinery for the usual processing as with other oil from an oil well.

Description of Another Possible Embodiment

Figure 4:
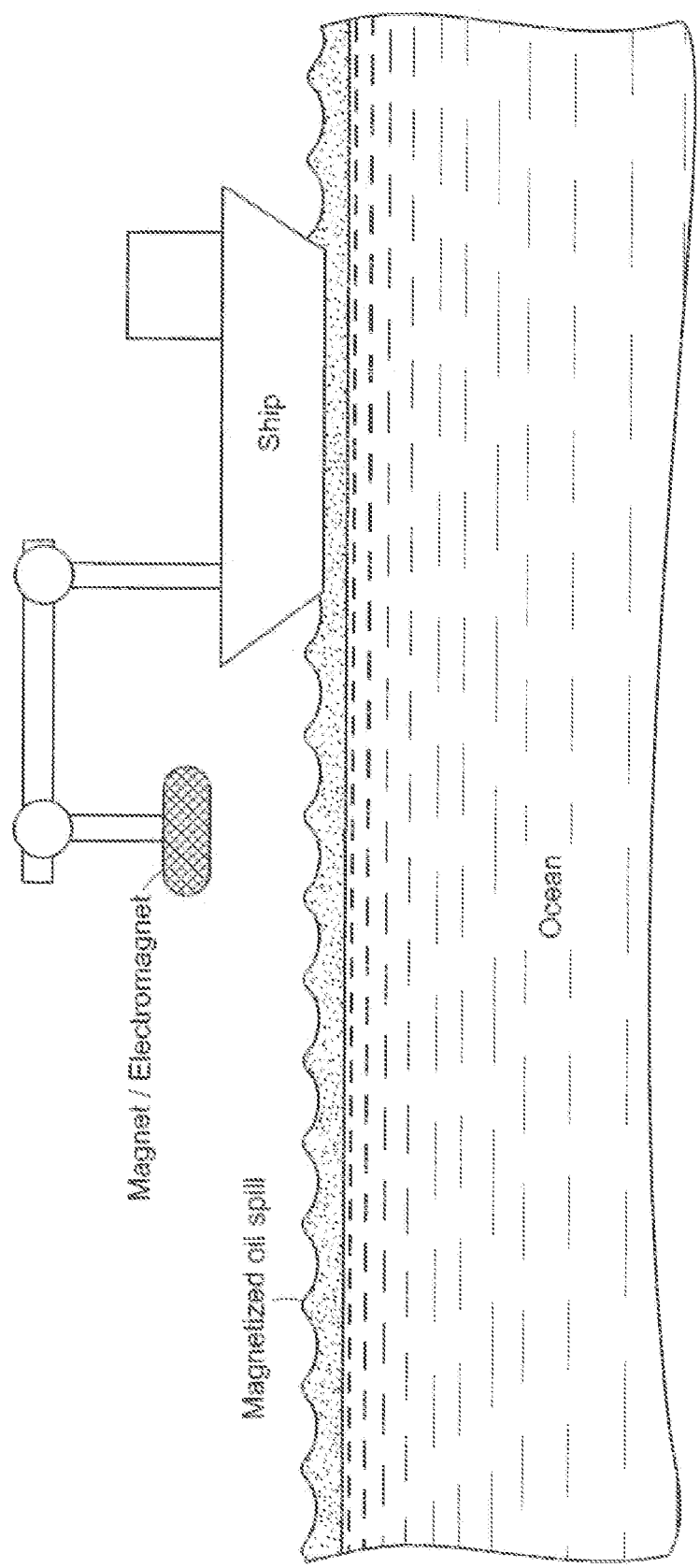
FIG. 4 is a schematic illustration of a boat with a deployable magnet for collecting magnetized oil.

Another possible embodiment for cleaning up oil spills is to add magnetizable material (with or without a surfactant) to the spilled oil making a magnetorheological fluid before lifting it out from the ocean using strong switchable permanent magnets or electromagnets (see FIG. 4). This is not a preferred embodiment because of the practical difficulty of controlling, recovering and reusing the magnetic material released into the ocean due to ocean currents, waves and wind. Depending on the amount and choice of magnetic material used it could also alter the chemical composition of the ocean and be detrimental to marine life. However, in the event of being eco-friendly and controllable, such a system in principle could be used to remove spilled oil from the ocean.

A calculation has shown that the magnetorheological fluid can agglomerate slowly enough to allow the oil to be removed with magnets if the magnetized particles are dispersed in the open ocean. For example, micron sized magnetizable particles will fall approximately one centimeter through oil in about 10,000 seconds which is more than enough time to remove the oil with magnets assuming the oil viscosity is about 10 times greater than water.

Calculation: Approximate calculation for magnetic particle velocity (U) due to gravity in viscous oil with no magnetic field applied:

$$U = \frac{2}{9\eta}(\rho_p - \rho_{oil})gR^2 = 9.4189 \times 10^{-7} \text{ m/s}$$

Thus the time to fall 1 centimeter through the oil is about 10,000 seconds; more than enough time to remove the oil with magnets.

U (m/s)=particle velocity
$\rho_p$ (kg/m$^3$)=mass density of magnetite particle=5,175 kg/m$^3$
$\rho_{oil}$ (kg/m$^3$)=mass density of oil=850 kg/m$^3$
g (m/s$^2$)=acceleration of gravity=9.8 m/s$^2$
R (m)=radius of magnetic particle=1×10$^{-6}$ m (one micron)
$\eta$ (N s/m$^2$)=oil viscosity=0.01 N s/m$^2$ (10 times greater than water)

It is recognized that modifications and variations of this invention will be apparent to those of ordinary skill in the art and it is intended that all such modifications and variations be included within the scope of the appended claims.

What is claimed is:

1. Method for oil removal from water comprising:
mixing a magnetizable material of order micron size and having no net magnetization with oil in the presence of water to form a magnetorheological fluid; and
magnetically attracting the magnetorheological fluid to separate oil and water phases.

2. Method for oil removal from water comprising:
mixing a magnetizable material of order nanometer or micron size with collected oil and water to form a magnetic Pickering emulsion; and
magnetically attracting the magnetic Pickering emulsion to separate oil and water phases.

3. The method of claim 1 or 2 further including stirring the magnetizable material into the oil/water using a magnetic field to form a substantially uniform distribution of the magnetizable material in the oil/water.

4. The method of claim 3 wherein the magnetic field is alternating or rotating.

5. The method of claim 3 wherein the magnetic field is generated from multiphase currents in coils or from mechanically rotating permanent magnets.

6. The method of claim 1 or 2 including stirring using mechanical or inline mixers.

7. The method of claim 1 or 2 wherein the magnetic attraction process uses a permanent magnet.

8. The method of claim 1 or 2 further including using magnetic separation techniques selected from the group consisting of a low-intensity magnetic separator, rare earth drum separator, rare earth roll separator, plate, wet roll, chute, wet high intensity magnetic separators or high gradient magnetic separators or Halbach array.

9. The method of claim 1 or 2 further including separating magnetized phase from the magnetized material after separating two liquid phases, using magnetic separation techniques selected from the group consisting of a low-intensity magnetic separator, rare earth drum separator, rare earth roll separator, plate, wet roll, chute, wet high intensity magnetic separators or high gradient magnetic separators or Halbach array.

10. The method of claim 8 where in the magnetic separation technique is selected from the group consisting of metal filtering meshes, magnetic filters, or magnets with a knife edge.

11. The method of claim 9 wherein separated magnetizable material is reused to further separate two liquid phases.

* * * * *